(12) United States Patent
Tsuji

(10) Patent No.: US 6,506,474 B2
(45) Date of Patent: Jan. 14, 2003

(54) COMPOSITE SHEET

(75) Inventor: Tomoko Tsuji, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 134 days.

(21) Appl. No.: 09/810,375

(22) Filed: Mar. 16, 2001

(65) Prior Publication Data

US 2001/0044250 A1 Nov. 22, 2001

(30) Foreign Application Priority Data

Mar. 27, 2000 (JP) ........................................ 2000-087386

(51) Int. Cl.[7] ................................................. D06N 7/04
(52) U.S. Cl. ....................... 428/152; 442/328; 442/366; 442/34
(58) Field of Search ................................ 442/366, 328, 442/340; 428/152

(56) References Cited

U.S. PATENT DOCUMENTS 5,219,633 A * 6/1993 Sabee .......................... 156/167

FOREIGN PATENT DOCUMENTS

| EP | 0 792 629 A2 | 9/1997 |
| EP | 0 814 189 A1 | 12/1997 |
| EP | 0 942 109 A2 | 9/1999 |
| GB | 1 352 041 | 5/1974 |
| JP | 7-328061 | 12/1995 |
| WO | WO 99/17926 | 4/1999 |

OTHER PUBLICATIONS

Copy of European Search Report dated Aug. 7, 2001.

* cited by examiner

*Primary Examiner*—Elizabeth M. Cole
(74) *Attorney, Agent, or Firm*—Baker & Daniels

(57) ABSTRACT

A composite sheet includes a nonwoven fabric and a plurality of fine, flexible and continuous filaments extending parallel one to another in a first direction and spaced apart one from another in second direction orthogonal to the first direction and bonded to the nonwoven fabric, wherein the nonwoven fabric and the continuous filaments are formed with a plurality of recoverable crepes extending in the second direction and continuously arranged in the first direction.

4 Claims, 4 Drawing Sheets

COMPOSITE SHEET

BACKGROUND OF THE INVENTION

This invention relates to a composite sheet having an elastic stretchability in one direction and more particularly to such a composite sheet suitable for topsheet materials for sanitary articles such as diapers, menstruation pads and the like.

Japanese Patent Application Publication No. 1995-328061A describes a topsheet comprising a liquid-pervious nonwoven fabric and a plurality of fine thermoplastic film strips extending in one direction and being spaced apart one from another transversely of the one direction and integrally bonded to the upper surface of the nonwoven fabric.

In the topsheet disclosed by the Publication, both the nonwoven fabric and the plastic film strips have no rubber-based elasticity and the topsheet does not have any elastic stretchability unless the topsheet is subjected to a special treatment. To ensure that this topsheet has an elastic stretchability, an elastically stretchable nonwoven fabric made of fibers obtained by melting and spinning thermoplastic elastomer should be used as the nonwoven fabric and elastically stretchable film obtained by extrusion molding thermoplastic elastomer should be used as the plastic film.

However, both a rubber-based elastically stretchable nonwoven fabric and a rubber-based elastically stretchable film inevitably have an uncomfortable touch such as a sticky or slimy touch and a body fluid absorbent sanitary article such as a disposable diaper or a sanitary napkin using the elastically stretchable nonwoven fabric and the elastically stretchable film may give a wearer of such article uncomfortable feeling if these materials come in contact with the wearer's skin.

SUMMARY OF THE INVENTION

It is an object of this invention to provide a composite sheet having an elastic stretchability and being free from a sticky or slimy touch without using any rubber-based material such as thermoplastic elastomer.

According to this invention, there is provided a composite sheet comprising a nonwoven fabric and a plurality of fine, flexible and continuous filaments extending parallel one to another in a first direction and spaced apart one from another transversely of the first direction.

The composite sheet further comprises an embodiment in which the nonwoven fabric and the continuous filaments are formed with a plurality of recoverable crepes extending in a second direction orthogonal to the first direction and continuously arranged in the first direction so that the nonwoven fabric and the continuous filaments may contract in the first direction at a predetermined ratio with respect to unit length of the composite sheet as measured in the first direction prior to formation of crepes in the nonwoven fabric and the continuous filaments and thereby the composite sheet has an elastic stretchability in the first direction.

The composite sheet according to this invention has an elastic stretchability in the first direction in spite of the fact that the composite sheet comprises the nonwoven fabric made from non-elastomeric thermoplastic synthetic resin fiber and the flexible continuous filaments made from non-elastomeric thermoplastic synthetic resin and bonded to the nonwoven fabric. This is achieved by the feature of this invention such that the nonwoven fabric and the filaments are formed with a plurality of crepes extending in the first direction and continuously arranged a second direction orthogonal to the first direction. The nonwoven fabric and the filaments both having no rubber-based elasticity can be stretched under tension substantially lower than that required to stretch the composite sheet comprising a rubber-based nonwoven fabric and filament.

The composite sheet using none of rubber-based materials such as thermoplastic elastomer is free from a sticky or slimy touch and it is not apprehended that the composite sheet might give a wearer of body fluid absorbent sanitary article using this composite sheet uncomfortable feeling even if the composite sheet comes in contact with the wearer's skin. The composite sheet according to this invention enables its strength as well as its shape- and dimension-stability to be improved by bonding a plurality of filaments to the nonwoven fabric. Accordingly, the composite sheet will be suitable, for example, for topsheet materials for sanitary articles such as diapers, menstruation pads, panty liners, incontinence pads and the like.

DETAILED DESCRIPTION OF THE PREFERRED EMBODIMENTS

Details of a composite sheet according to this invention will be more fully understood from the description given hereunder with reference to the accompanying drawings.

Figure 1:
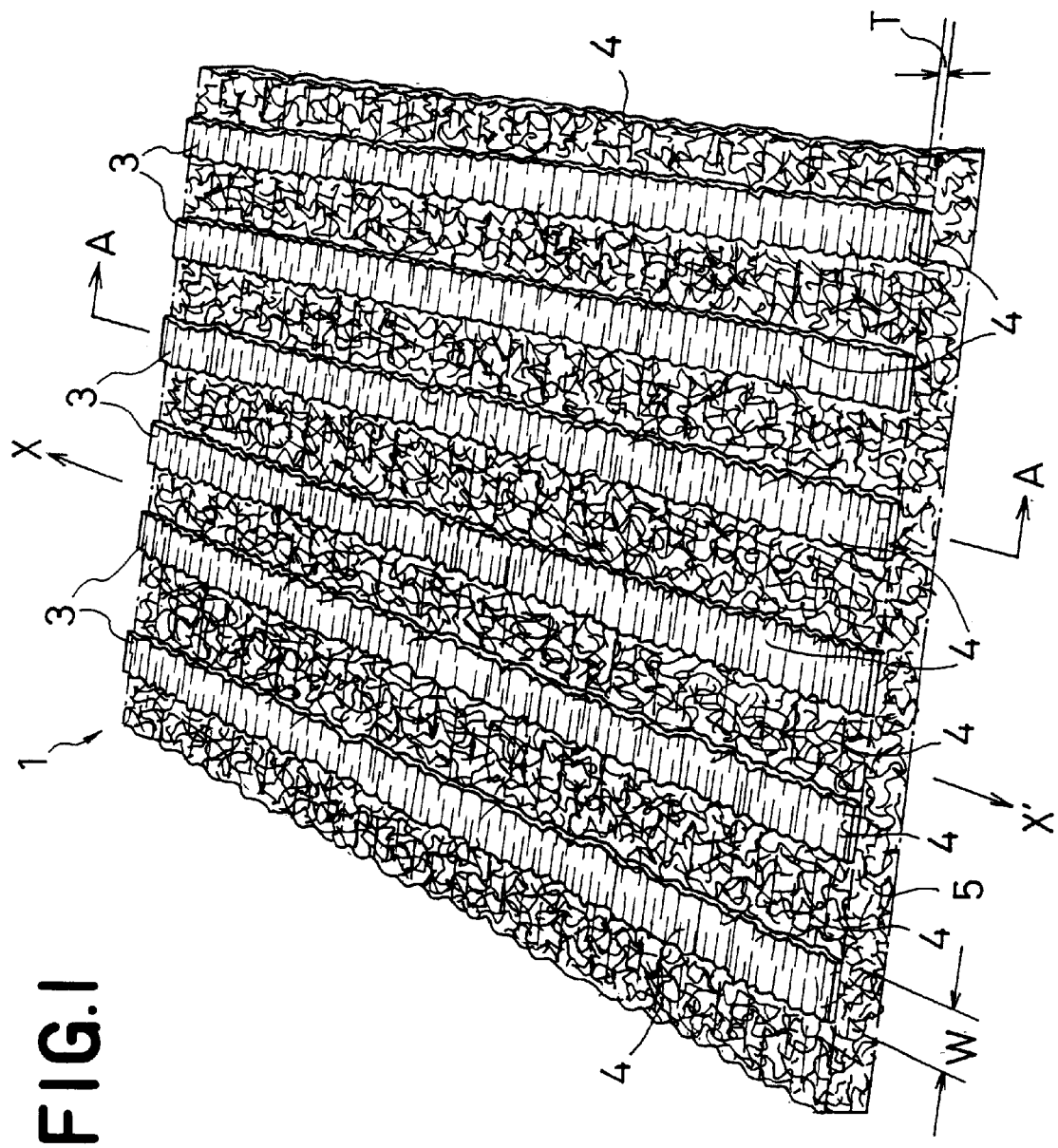
FIG. 1 is a perspective view of a composite sheet according to this invention.
Figure 2:
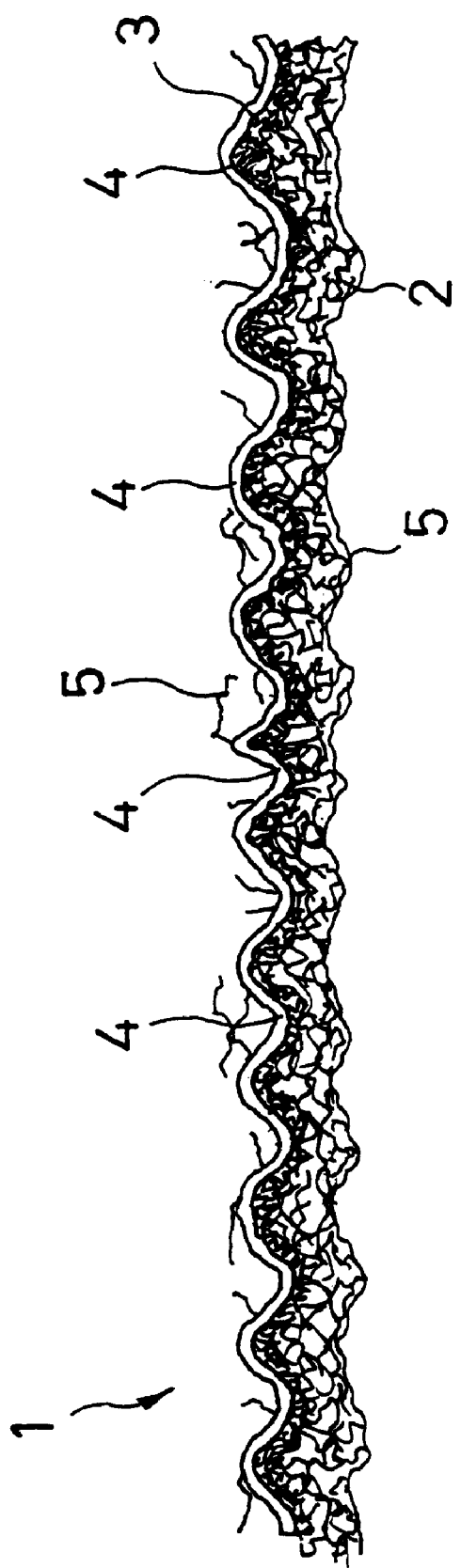
FIG. 2 is a sectional view taken along line A—A in FIG. 1.
Figure 3:
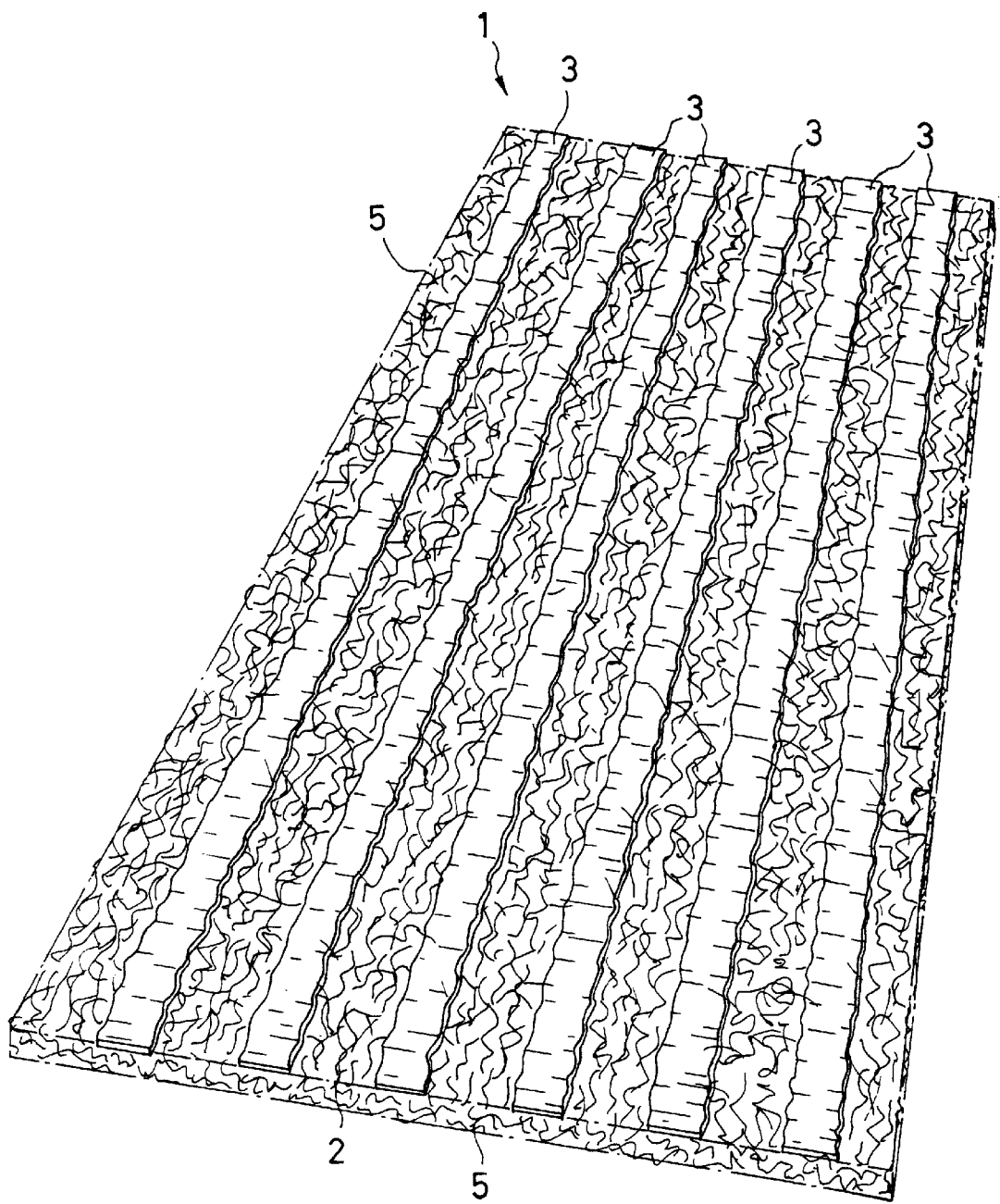
FIG. 3 is a perspective view depicting the composite sheet as being stretched.

FIG. 1 is a perspective view of a composite sheet 1 according to this invention, FIG. 2 is a sectional view taken along line A—A in FIG. 1 and FIG. 3 is a perspective view depicting the composite sheet 1 as being stretched. The composite sheet 1 comprises a nonwoven fabric 2 and a plurality of fine flexible continuous filaments 3.

The filaments 3 are bonded to one sheet surface of the nonwoven fabric 2 so as to extend parallel one to another and to be spaced apart one from another on the sheet surface of the nonwoven fabric 2 longitudinally as viewed in FIG. 1. The nonwoven fabric 2 and the filaments 3 form a plurality of recoverable crepes or crepes 4 each extending transversely as viewed in FIG. 1, i.e., these crepes continuously undulate longitudinally as viewed in FIG. 1. In other words, the nonwoven fabric 2 and the filaments 3 have contracted in the longitudinal direction at a predetermined ratio with respect to the unit length of the composite sheet 1 prior to formation of the crepes 4 in these nonwoven fabric 2 and filaments 3.

It is possible to improve a strength as well as shape- and dimension-stability of the composite sheet 1 by bonding a plurality of the filaments 3 to the nonwoven fabric 2 in comparison to the sheet comprising the nonwoven fabric 2 alone. Having contracted in its longitudinal direction, the nonwoven fabric 2 has a density of its component fibers 5 higher than that it has prior to contraction.

Under tension in the direction indicated by an arrow X–X' in FIG. 1, the crepes 4 formed by the nonwoven fabric 2 and the filaments 3 of the composite sheet 1 are smoothed down and disappear. Correspondingly, these nonwoven fabric 2 and filaments 3 are stretched in the longitudinal direction substantially to their respective length prior to formation of the crepes 4 in these nonwoven fabric and filaments 2, 3. The composite sheet 1 as a whole can be longitudinally stretched as the nonwoven fabric 2 and the filaments 3 are stretched. Relieved of the tension, the nonwoven fabric 2 and the filaments 3 of the composite sheet 1 contract again to recover the crepes 4. The nonwoven fabric 2 and the filaments 3 longitudinally contract again in this manner and the composite sheet 1 as a whole longitudinally contracts again to the state of FIG. 1.

A ratio at which the nonwoven fabric 2 and the filaments 3 are able to contract is a range of 10~80% (The composite sheet 1 having a length of 100 mm prior to formation of the crepes 4 in the nonwoven fabric 2 and the filaments 3 contracts to a length of 20~90 mm as the nonwoven fabric 2 and filaments 3 contract), more preferably in a range of 30~60%. With the contraction ratio less than 10%, it will be impossible to provide the composite sheet 1 with a desired stretchability. With the contraction ratio exceeding 80%, it will be required to form correspondingly much more crepes 4 in the nonwoven fabric 2 and the filaments 3 in order to contract them at the ratio higher than 80%. However, a process for achieving this is not practical.

The filaments 3 are made of non-elastomeric thermoplastic synthetic resin. The synthetic resin used for this purpose may be selected from a group of thermoplastic materials including a low density polyethylene, linear low density polyethylene, a medium density polyethylene, high density polyethylene, metallocene polyethylene, block polymerized polypropylene, random polymerized polypropylene, homopolymerized polypropylene, metallocene polypropylene, ethylene vinylacetate copolymer and polyethylene terephthalate. Cross-section presented by each of the filaments 3 is not critical and may be circular, elliptical, rectangular, polygonal, or even of indeterminate shape. The filaments 3 may be also of thread-like or film-like.

The nonwoven fabric 2 is made of non-elastomeric thermoplastic synthetic resin fibers 5. Type of the nonwoven fabric 2 used for this purpose may be selected from a group including spun lace-, needle punch-, melt blown-, thermal bond-, spun bond- and chemical bond-types. The synthetic resin fibers 5 may be selected from a group including polyolefine, polyester, polyamide fibers, core-sheath type conjugated fibers such as polyethylene/polypropylene, polyethylene/polyester and polyethylene/polyethylene terephthalate and side-by-side type conjugated fibers.

Each stripe defined by the filaments 3 has a width W of 0.15~1.00 mm as measured transversely of the longitudinal direction and a thickness T of 0.01~1.00 mm. With the width less than 0.15 mm and the thickness less than 0.01 mm, the filaments 3 will have a strength decreased to the degree such that the filaments 3 are broken at a plurality of locations as the composite sheet 1 is stretched and a contractile force of the composite sheet 1 after relieved of the tension will be correspondingly decreased. With the width W exceeding 1.00 mm and the thickness exceeding 1.00 mm, on the other hand, a tensile strength of the filaments 3 will be excessively increased and an inconveniently high tension will be required to stretch the composite sheet 1.

A ratio at which the filaments 3 occupy the nonwoven fabric 2 per unit area of the latter is 10~50%. With this ratio less than 10%, it will be impossible to improve the strength and the shape- as well as the dimension-stability of the composite sheet 1. With this ratio exceeding 50%, on the other hand, the composite sheet 1 will be provided with an excessive tensile strength and a correspondingly high tension will be required to stretch the composite sheet 1.

The nonwoven fabric 2 has a basis weight of 5~100 g/m$^2$ and the component fiber 5 of the nonwoven fabric 2 has a fineness of 0.5~10 dtex. With the basis weight of the nonwoven fabric 2 less than 5 g/m$^2$ and the fineness of the fibers 5 less than 0.5 dtex, the nonwoven fabric 2 has a strength decreased to the degree such that the nonwoven fabric 2 may be broken as the composite sheet 1 is repeatedly stretched and it may become difficult to keep the proper shape of the composite sheet 1. With the basis weight of the nonwoven fabric 2 exceeding 100 g/m$^2$ and the fineness of the fibers 5 exceeding 10 dtex, the component fibers 5 of the nonwoven fabric 2 will have an excessively high density and thereby the nonwoven fabric 2 will have a stiffness too high to form the crepes 4 in the nonwoven fabric 2. This will lead also to a decreased flexibility of the composite sheet 1.

Figure 4:
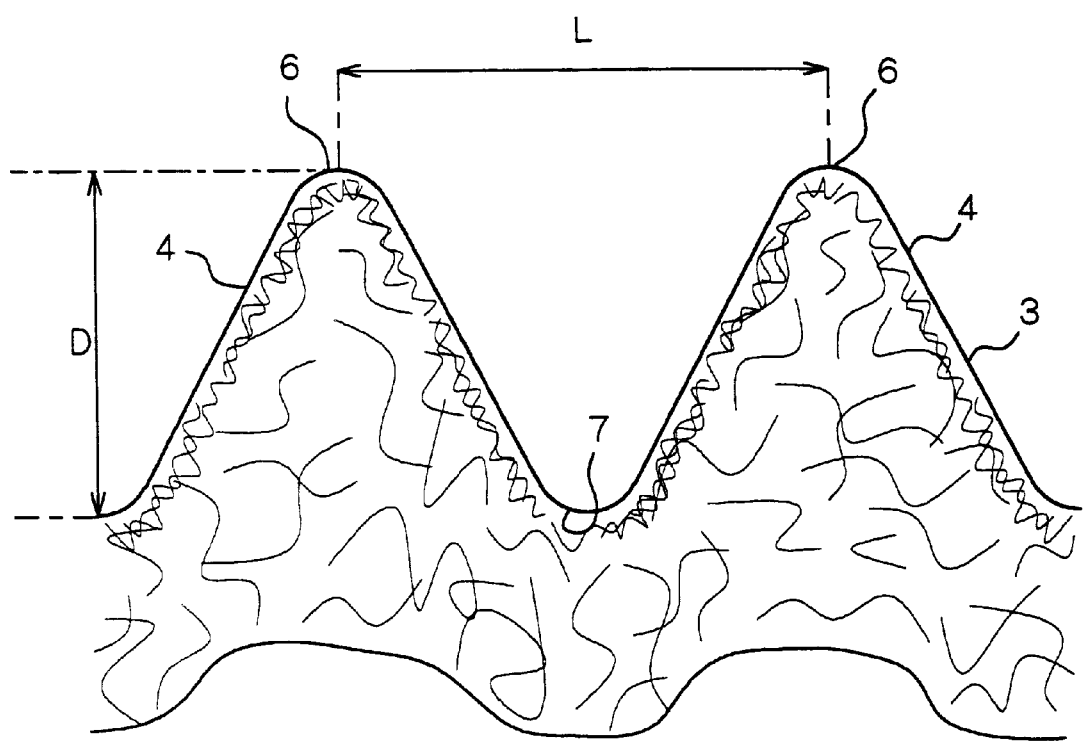
FIG. 4 is a fragmentary sectional view schematically depicting the partially cutaway composite sheet.

FIG. 4 is a fragmentary sectional view schematically depicting the nonwoven fabric 2 and the continuous filaments 3. The nonwoven fabric 2 and the filaments 3 both formed with the crepes 4 undulate in the longitudinal direction so that crests 6 and troughs 7 may alternate in the longitudinal direction. For the filaments 3, a value L/D is preferably in a range of 0.2~5.5 wherein L represents a length of the filament 3 as measured between each pair of the adjacent crests 6 and D represents a height from the trough 7 to the crest 6, i.e., a depth from the crest 6 to the trough 7. It is practically difficult to for the crepes 4 in the nonwoven fabric 2 and the filaments 3 so that the value L/D may be less than 0.2 after the filaments 3 have been bonded to the nonwoven fabric 3. With the value L/D exceeding 5.5, the nonwoven fabric 2 as well as the filaments 3 will be formed merely with the crepes 4 of gentle undulation. Such gentle undulation will cause an insufficient contraction of the nonwoven fabric 2 and the filaments 3 and will make it impossible to provide the composite sheet 1 with a desired stretchability.

An example of the process for making the composite sheet 1 will be described. The process generally comprises a first step of bonding the filaments 3 to one surface of the nonwoven fabric 2 to obtain a basic composite sheet 1 and a second step of providing the composite sheet 1 with the crepes 4.

In the first step, the nonwoven fabric 2 is continuously fed in the longitudinal direction as molten synthetic resin is discharged from an extruder in a plurality of fine streams onto the surface of the nonwoven fabric 2 so that the synthetic resin in molten state may be sealed with and bonded to the sheet surface of the nonwoven fabric 2. After cooled and solidified, the synthetic resin forms a plurality of the filaments 3 transversely extending parallel one to another and longitudinally spaced apart one from another on the sheet surface of the nonwoven fabric 2. In this manner, the composite sheet 1 is obtained. If desired, the nonwoven fabric 2 to which the filaments 3 have been bonded may be fed into a nip between a pair of rolls and pressed therebetween to reinforce a bonding effect between the nonwoven fabric 2 and the filaments 3.

In the second step, a roller and blade located at the downstream of the first step are utilized to form the nonwoven fabric 2 and the filaments 3 with the crepes 4. The blade is normally biased to bear against the roller under predetermined pressure. The composite sheet 1 entering a nip between the roller and the blade is forced under pressure exerted by the blade to reduce its travelling velocity along a peripheral surface of the roller and compressed under a frictional shear by the blade. As a result, the nonwoven fabric 2 and the filaments 3 are formed with a plurality of crepes 4 arranged in the travelling direction of the composite sheet 1.

It is possible without departing from the scope of this invention to bond a plurality of filaments extending parallel one to another in one direction not only to one sheet surface but also to the other sheet surface of the nonwoven fabric 2 and to form these nonwoven fabric 2 and filaments 3 with a plurality of recoverable crepes 4 continuously arranged in one direction. It is also possible to bond second nonwoven fabric to the sheet surface of the nonwoven fabric 2 having the filaments 3 previously bonded thereto and thereby to cover the filaments 3 with the second nonwoven fabric. In this case, the second nonwoven fabric is bonded to the sheet surface of the nonwoven fabric 2 preferably as the composite sheet 1 is being stretched. In the composite sheet 1, the filaments 3 preferably have a stiffness higher than that of the nonwoven fabric 2 to ensure that the strength and the shape- as well as the dimension-stability of the composite sheet 1 can be further improved. However, it is possible without departing from the scope of this invention to preadjust the stiffness of the nonwoven fabric 2 to be higher than that of the filaments 3.

The composite sheet 1 according to this invention is applicable not only to a body fluid absorbent sanitary articles such as a disposable diaper and a sanitary napkin but also to the other sanitary articles such as a basic material for bandage or wet compress.

What is claimed is:

1. A composite sheet comprising:

a nonwoven fabric;

a plurality of fine, flexible and continuous filaments extending parallel one to another in a first direction and spaced apart one from another in a second direction orthogonal to said first direction; and said nonwoven fabric and said continuous filaments being formed with a plurality of recoverable crepes extending in said second direction and continuously arranged in said first direction so that said nonwoven fabric and said continuous filaments contract one another in said first direction at a ratio with respect to unit length of said composite sheet as measured in said first direction prior to formation of said crepes in said nonwoven fabric and said continuous filaments and thereby said composite sheet has an elastic stretchability in said first direction.

2. The composite sheet according to claim 1, wherein said continuous filaments are made from a non-elastomeric thermoplastic synthetic resin and strips defined by said continuous filaments have widths of about 0.15 to 1.00 as measured transversely of said first direction and thicknesses of about 0.01 to 1.00 and a ratio at which said continuous filaments occupy said nonwoven fabric per unit area is in a range of about 10 to 50%.

3. The composite sheet according to claim 1, wherein said nonwoven fabric is made from a non-elastomeric thermoplastic synthetic resin fiber and said synthetic resin fiber has a fineness of about 0.5 to 10 dtex and a basis weight of about 5 to 100 g/m$^2$.

4. The composite sheet according to claim 1, wherein said ratio is in a range of out 10 to 80%.

* * * * *